United States Patent Office 3,255,255
Patented June 7, 1966

3,255,255
PREPARATION OF PHENOLIC COMPOUNDS
Harold D. Orloff, Oak Park, Mich., assignor to Ethyl Corporation, New York, N.Y., a corporation of Virginia
No Drawing. Filed Dec. 4, 1961, Ser. No. 156,968
1 Claim. (Cl. 260—619)

This invention deals with the preparation of a novel class of compounds. More particularly it relates to the preparation of a novel and unusual class of substituted phenolic compounds.

The substituted phenolic compounds to which this invention relates are extremely useful antioxidants. They have been found to be superior antioxidants for use in lubricating and other industrial oils, petroleum wax, polymers including both synthetic and natural polymers and a wide range of other organic media.

An object of this invention is to provide a novel chemical process for preparing the above substituted phenolic compounds. A further object is to provide a process which comprises reacting certain 2,6-disubstituted phenols with certain hydroxycarbyl substituted phenols. A still further object is to provide a process which comprises reacting certain 2,6-disubstituted phenols with certain 2,6-dihydroxycarbyl-para-substituted phenols. Other important objects of this invention will be apparent from the ensuing description.

The above and other objects of this invention are accomplished by providing a process which comprises reacting a compound having the formula (I)
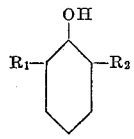

wherein $R_1$ and $R_2$ are selected from the group consisting of alkyl of from 1–12 carbon atoms, aralkyl of from 7–12 carbon atoms and cycloalkyl of from 5–12 carbon atoms with a compound having the formula (II)
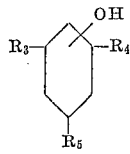

wherein $R_3$ is selected from the group consisting of alkyl of from 1–12 carbon atoms, aralkyl of from 7–12 carbon atoms and cycloalkyl of from 5–12 carbon atoms, $R_4$ and $R_5$ are selected from the group consisting of $R_3$ type and (III)

wherein $R_6$ is selected from the group consisting of hydrogen, alkyl of from 1–12 carbon atoms and mononuclear aryl of from 6–12 carbon atoms, such that at least one of $R_4$ and $R_5$ is

in the presence of an acid catalyst.

The 2,6-disubstituted phenols of Formula I are commercially available and are well known to the art. They can be prepared by the reaction of phenol with the corresponding olefin in the presence of an aluminum triphenoxide catalyst.

The preparation of certain preferred reactants of Formula II is disclosed in an application, Serial No. 156,964, filed December 4, 1961, concurrently with the present application, entitled, "Phenolic Methylol Compounds," the inventors being Harry R. Dittmar and John P. Napolitano. They can be prepared by reacting a suitable phenol with an aldehyde having from 1–13 carbon atoms in the presence of a catalytic quantity of a basic catalyst and removing the hydroxycarbyl phenol from the reaction mixture thereby produced.

The 2,6-disubstituted phenol and the hydroxycarbyl phenol are preferably present in substantially stoichiometric ratio; that is, the preferred molar concentration of the 2,6-disubstituted phenol of Formula I relative to the molar concentration of the hydroxycarbyl phenol of Formula II is directly related to the number of hydroxycarbyl groups on the latter reactant. Thus, when a 2,6-dihydroxycarbyl phenol is used as a reactant the molar ratio of the 2,6-disubstituted phenol of Formula I to that hydroxycarbyl phenol is preferably about 2:1. Further, the 2,6-disubstituted phenol may also be present in molar excess. However, there is no appreciable advantage to using more than five times the stoichiometric concentration of the hydroxycarbyl phenol. The reaction will also proceed when the 2,6-disubstituted phenol is present in less than stoichiometric amount but yields are correspondingly lowered.

There is no special order in which the reactants need be mixed. However, the reaction has been found to proceed more smoothly without the formation of undesirable side products when the hydroxycarbyl phenol is added gradually to the 2,6-disubstituted phenol.

The reaction can be carried out with or without a solvent. The reactants and catalysts can be heated and stirred together to form the products of the two phenolic reactants, or they can be melted together, with the catalyst being subsequently added or the reaction can be conducted in the presence of a solvent.

Suitable solvents may be aromatic hydrocarbons such as benzene, toluene, xylene and mesitylene; saturated hydrocarbons such as pentane, hexane, isooctane, dodecane, hexadecane, nonadecane and their isomers; ethers such as ethyl ether and propyl ether; esters such as methyl acetate, propyl acetate, ethyl propionate, amyl acetate and methyl butyrate; organic acids such as acetic acid, propionic acid, butyric acid, valeric acid, dodecanoic acid, lauric acid and stearic acid; and dioxane. These solvents may be chlorinated. Sulfur-containing solvents such as carbon disulphide are also useful.

The catalysts employed are preferably acid catalysts such as hydrogen chloride, hydrogen bromide, hydrogen iodide, phosphoric acid, sulfuric acid, $POCl_3$, Friedel-Crafts catalysts such as $ZnCl_2$, $MgCl_2$, $AlCl_3$ and $SnI_4$. When using a catalyst having a gaseous form it can be added to the reaction by bubbling through the reaction mixture.

Hydrogen chloride is a preferred catalyst since it affords higher yields in the least amount of time. Further, it has been found that by using about 115 to 180 parts of HCl per mole of hydroxycarbyl phenol higher yields are obtained.

The temperatures employed are not critical. The reaction may be conveniently conducted from well below room temperature up to about 150° C. A preferred temperature range is from about 0° C. to about 100° C. Good yields at convenient reaction times are obtained with this temperature range. The most convenient temperature range is about 95–100° C. At this range the reaction proceeds smoothly with a minimum of undesirable side products being formed.

Reaction times of from a few minutes to a week or more can be employed. It is found that reaction times of from an hour to about 72 hours are sufficient for good results.

The reaction can be advantageously carried out in the presence of inert atmosphere. Thus a nitrogen sweep may be maintained over the reaction mixture during the course of the reaction. Such techniques will result in a purer product since undesirable side reactions initiated by the presence of oxygen are avoided.

It may sometimes be desirable to purify the product formed from the process of this invention. A convenient method is to dissolve the product in n-hexane and add methanol which will form a separate layer. A series of n-hexane extractions carried out by refluxing briefly and separating the n-hexane layer will effectively purify the product which will crystallize out of the n-hexane layer.

Another method is to add a small amount of phenol at the end of the reaction. This will react with polymeric by-products formed from the hydroxycarbyl phenol to give methanol-soluble resins. Hexane and methanol are then added to the resultant mixture and a two-phase extraction is performed with n-hexane, the n-hexane layer being separated. The desired product crystallizes out of the n-hexane layer in good purity.

The compounds produced by the practice of this invention have the formula (IV)
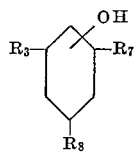

wherein $R_3$ is as in Formula II and $R_7$ and $R_8$ are selected from the group consisting of $R_3$ type and (V)
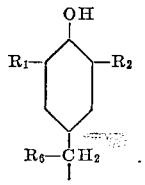

wherein $R_1$ and $R_2$ are as in Formula I and $R_6$ is as in Formula III. The compounds of this invention are generally water and acid in soluble, white to amber resins or crystalline solids. They are ashless, non-corrosive, substantially non-volatile and hydrolytically stable facilitating their incorporation into a wide range of organic material.

The following examples in which all parts and percentages are by weight illustrate the practice of this invention according to the method outline above.

*Example 1*

In a reaction vessel equipped with heating means, stirring means and temperature measuring means were placed 65.6 parts of 2-methyl-6-tert-butylphenol and 33.6 parts of 2,6-dimethylol-p-cresol. The temperature was slowly raised and the solid reactants were melted with stirring. When the temperature reached 105–110° C. small portions of concentrated HCl were added. A total of 59 parts of HCl were added over a period of 7 hours while the temperature was held at 105–110° C. Heating was stopped and the mixture allowed to come to room temperature, about 23–25° C. Upon standing a solid precipitated. This solid was filtered and recrystallized from a 50 percent mixture of n-hexane-benzene to yield white crystalline $\alpha^2,\alpha^6$-bis(5-tert-butyl-4-hydroxy-m-tolyl)mesitol which had a melting point of 136° C.

*Analysis.*—Calculated for $C_{31}H_{40}O_3$: 80.8 percent carbon, 8.75 percent hydrogen, 460.6 molecular weight. Found: 80.2 percent carbon, 8.90 percent hydrogen, 474 molecular weight (ebullioscopic).

Good results are also obtained when other 2,6-disubstituted phenols are reacted with other hydroxycarbyl phenols in the manner of Example 1. For example, substantially two equivalent of 2-n-decycl-6-n-octylphenol can be reacted with one equivalent of 2,6-di-(1-ethylol)-4-n-propylphenol in the presence of HCl to produce $\alpha^2,\alpha^6$-bis(2 - n - decyl - 4 - hydroxy - 5 - n - octylphenyl)-$\alpha^2,\alpha^6$-dimethyl-4-n-propyl-2,6-xylenol. Also 2,6-dicyclohexylphenol can be reacted with 2,6-di-(1-n-octylol)-4-n-dodecylphenol in the presence of HBr to produce $\alpha^2,\alpha^6$-bis(3,5 - dicyclohexyl - 4 - hydroxyphenyl) - $\alpha^2,\alpha^6$-di-n-octyl-4-n-dodecyl-2,6-xylenol. Likewise 2-benzyl-6-p-ethylcyclohexylphenol can be reacted with 2,6-dimethylol-4-tert-octylphenol in the presence of HI to produce $\alpha^2,\alpha^6$-bis(3 - benzyl - 5 - p - ethylcyclohexyl - 4 - hydroxyphenyl)-4-tert-octyl-2,6-xylenol. Further, 2,6-di-tert-butylphenol can be reacted with 2,4-dimethylol-o-cresol in chlorobenzene and in the presence of HCl to produce $\alpha^2,\alpha^4$-bis(3,5-di-tert-butyl-4-hydroxyphenyl) mesitol.

*Example 2*

A reaction vessel equipped with stirring means, heating means, temperature measuring means, gas inlet and outlet tubes and a nitrogen source was flushed with nitrogen and charged with 82.1 parts of 2-methyl-6-tert-butylphenol and 61.6 parts of 2,6-dimethylol-4-tert-octylphenol at 22° C. Fifty-nine parts of HCl were added slowly with stirring. The temperature was then raised over a period of 20 minutes to 100° C. and held there for 6 hours. Three additional portions of concentrated HCl, 18 parts each, were added at 1, 2.25 and 4.75 hours. A solid precipitated which was filtered, boiled twice with 85 parts of n-hexane and filtered hot. The hexane filtrate was stripped of volatiles at about 95–100° C. yielding as a tacky, light amber resin $\alpha^2,\alpha^6$-bis(5-tert-butyl-4-hydroxy-m-tolyl)-4-tert-octyl-2,6-xylenol.

Following the above procedure good results are also obtained when 2,6-diisopropylphenol is reacted with 2,6-dimethylol-p-cresol in the presence of a catalytic amount of $MgCl_2$ to produce $\alpha^2,\alpha^6$-bis(3,5-diisopropyl-4-hydroxyphenyl)mesitol. Likewise 2,6-di-tert-butylphenol can be similarly reacted with 2,6-dimethylol-4-n-nonylphenol in the presence of a catalytic amount of $ZnCl_2$ to yield $\alpha^2,\alpha^6$-bis(3,5 - di - tert-butyl-4-hydroxyphenyl)-4-n-nonyl-2,6-xylenol. Also 2,6-di-n-dodecylphenol can be reacted with 2,6-di-methylol-4-tert-butylphenol in the presence of a catalytic amount of $SnCl_4$ to yield $\alpha^2,\alpha^6$-bis(3,5-di-n-dodecyl-4-hydroxyphenyl)-4-tert-butyl-2,6-xylenol. Further, 2-methyl-6-tert-butyl-phenol can be reacted with 2,4-dimethylol-o-cresol dioxane and in the presence of a catalytic amount of $MgCl_2$ to yield $\alpha^2,\alpha^4$-bis(3-tert-butyl-4-hydroxy-5-methylphenyl)mesitol.

*Example 3*

In a reaction vessel equipped with heating and cooling means, stirring means, temperature measuring means, gas inlet and outlet tubes and an HCl source were charged 156 parts of glacial acetic acid, 68.5 parts of 2-methyl-6-tert-butyl-phenol and 33.6 parts of 2,6-dimethylol-p-cresol. The mixture was cooled to 10° C. and anhydrous HCl bubbled through the mixture for 4 hours at 5–20° C. The mixture was then stirred at 5° C. for two hours and allowed to come to room temperature. The material was poured into ice water whereupon a resinous material formed which was separated and dissolved in a 50 percent mixture of n-hexane and toluene. This solution was washed with water, dilute aqueous sodium bicarbonate, water again and then dried over anhydrous sodium sulphate. It was then filtered and stripped of volatiles at 95–100° C. to yield $\alpha^2,\alpha^6$-bis(5-tert-butyl-4-hydroxy-m-tolyl)mesitol.

Good results are likewise obtained when other 2,6-dialkyl-phenols are reacted with other 2,6-dihydrocarbylol-p-substituted phenols in the manner of Example 3. For example, 2-($\alpha$-ethylbenzyl)-6-($\alpha,\alpha$-diethylbenzyl)phenol can be reacted with 2,6-di-($\alpha$-benzylol)-4-n-heptylphenol in tetrachloroethane with HBr as a catalyst to yield $\alpha^2,\alpha^6$-bis[3 - ($\alpha$-ethylbenzyl)-5-($\alpha,\alpha$-diethylbenzyl)-4-hydroxyphenyl]-$\alpha^2,\alpha^6$-diphenyl-4-n-heptyl-2,6-xylenol. Likewise 2-p-n-butylcyclohexyl-6-p-n-heptylcyclopentylphenol can be reacted with 2,6-dimethylol-4-(p-n-hexylcyclohexyl)phenol in chlorobenzene with HI as a catalyst to produce $\alpha^2,\alpha^6$ - bis(3-p-n-butylcyclohexyl-5-p-n-heptylcyclopentyl-4 - hydroxyphenyl) - 4-p-n-hexylcyclohexyl-2,6-xylenol. Further, 2,6-di-tert-octylphenol can be reacted with 2,6-diisopropyl-4-methylolphenol and a catalytic amount of HCl in benzene to prepare $\alpha$-(3,5-di-tert-octyl-4-hydroxyphenyl)-2,6-diisopropyl-p-cresol.

Example 4

In a reaction vessel equipped with heating and cooling means, stirring means and temperature measuring means are placed 206 parts of 2,6-di-tert-butylphenol in 175 parts of iso-octane and 120 parts of concentrated HCl. Eighty-four parts of 2,6-dimethylol-p-cresol are added. The reaction mixture is heated to about 95–100° C., maintained at that temperature for a few minues and then allowed to cool to room temperature, about 23–25° C. A solid precipitate which is filtered and recrystallized from a 50 percent mixture of n-hexane-benzene to yield $\alpha^2,\alpha^6$-bis(3,5-di-tert-butyl-4-hydroxyphenyl)-4-tert-octyl-2,6-xylenol.

Good results are also obtained by following the above procedure when 2,6-diisopropylphenol is reacted in toluene with 2,6-dimethylol-4-tert-octylphenol in the presence of a catalytic amount of $ZnCl_2$ to yield $\alpha^2,\alpha^6$-bis(3,5-diisopropyl - 4-hydroxyphenyl) - 4-tert-octyl-2,6-xylenol. Likewise 2-sec-butyl-6-n-hexylphenol can be reacted in ethylene dichloride with 2,6-dimethylol-4-ethylphenol and a catalytic amount of $MgCl_2$ to yield $\alpha^2,\alpha^6$-bis(3-sec-butyl-5 - n-hexyl-4-hydroxyphenyl)-4-ethyl-2,6-xylenol. Also 2,6-dicyclopentyl-phenol can be reacted in carbon disulphide with 2,6-dimethylol-4-cyclohexylphenol and a catalytic amount of $AlCl_3$ to yield $\alpha^2,\alpha^6$-bis(3,5-dicyclopentyl-4-hydroxyphenyl)-4-cyclohexyl-2,6-xylenol. Further, 2-p-n-amylcyclohexyl-6-cyclopentylphenol can be reacted with 2-n-nonyl-6-n-propyl-4-(1-tridecylol)phenol in hexane and in the presence of a catalytic amount of $ZnCl_2$ to yield $\alpha$-(3-p-n-amylcyclohexyl-5-cyclopentyl-4-hydroxyphenyl)-$\alpha$-n-decyl-2-n-propyl-6-n-nonyl-p-cresol.

Example 5

In a reaction vessel equipped with heating and cooling means, stirring means and temperature measuring means are placed 330 parts of 2-($\alpha$-methylbenzyl)-6-($\alpha$-ethyl-$\alpha$-methylbenzyl)phenol and 84 parts of 2,6-dimethylol-p-cresol. The mixture is cooled to 0° C. and 2 parts of $SnCl_4$ are added. The reaction mixture is stirred at 0° C. for a period of one week and then allowed to come to room temperature. The mixture is diluted with 200 parts of n-hexane and 200 parts of methanol are added. Two layers are formed. The methanol layer (bottom) is counter-currently extracted with n-hexane, and the n-hexane portions taken together. The n-hexane liquor is then stripped of volatiles at about 95–100° C. to yield as a solid residue $\alpha^2,\alpha^6$-bis[3-($\alpha$-methylbenzyl)-5-($\alpha$-ethyl-$\alpha$-methylbenzyl)-4-hydroxyphenyl]mesitol.

Example 6

In a reaction vessel equipped with heating and cooling means, stirring means, condensing means and temperature measuring means are placed 103 parts of 2,6-di-tert-butylphenol, 42 parts of 2,6-dimethylol-4-tert-octylphenol, 60 parts of concentrated HCl and 300 parts of toluene. The mixture is heated to 150° C. and stirred at that temperature for one hour. Ten parts of phenol are then added, the reaction is continued for another 10 minutes and then allowed to cool to room temperature, about 23–25° C. The mixture is diluted with 300 parts of n-hexane and 300 parts of methanol are added. Two layers are formed. The methanol layer (bottom) is counter-currently extracted with n-hexane and the n-hexane portions taken together. The n-hexane liquor is then stripped of volatiles at about 95–100° C. to yield $\alpha^2,\alpha^6$ - bis(3,5 - di - tert - butyl - 4 - hydroxyphenyl) - 4-tert-octyl-2,6-xylenol.

Good results are also obtained when 2-p-n-amylbenzyl-6-o-methylcyclohexylphenol is reacted with 2,6-dimethylol-4-n-amylphenol and a catalytic amount of sulphuric acid in benzene to yield $\alpha^2,\alpha^6$-bis(3-p-n-amylbenzyl-5-o-methylcyclohexyl - 4 - hydroxyphenyl) - 4 - p - n - amyl-2,6-xylenol. Likewise 2-p-ethylcyclopentyl-6-n-heptylphenol can be reacted with 2,6-di-($\alpha$-p-n-propylbenzylol)-4-n-amylcyclohexylphenol in dioxane with a catalytic amount of $ZnCl_2$ to yield $\alpha^2,\alpha^6$-bis(3-p-ethylcyclopentyl-5 - n - heptyl - 4 - hydroxyphenyl) - $\alpha^2,\alpha^6$ - di- p - n-propylphenyl-4-p-n-amylcyclohexyl-2,6-xylenol. Also 2-p-ethylcyclohexyl-6-cyclopentylphenol can be reacted with 2,6-di-(1-tridecylol)-4-n-octylphenol in toluene with a catalytic amount of HCl to yield $\alpha^2,\alpha^6$-bis(3-p-ethylcyclohexyl - 5 - cyclopentyl - 4 - hydroxyphenyl) - $\alpha^2,\alpha^6$ - di-n-dodecyl-4-n-octyl-2,6-xylenol. Further, 2,6 - di-tert-butylphenol can be reacted with 2-tert-butyl-4,6-dimethylolphenol in benzene and with a catalytic quantity of $AlCl_3$ to prepare $\alpha^2,\alpha^4$-bis(3,5-di-tert-butyl-4-hydroxyphenyl)-6-tert-butyl-2,4-xylenol.

Example 7

In a reaction vessel equipped with heating means, stirring means and temperature measuring means are placed 19.1 parts of 2-tert-butyl-6-isopropylphenol, 8.4 parts of 2,6-dimethylol-p-cresol, 100 parts of dipropyl ether and 15 parts of concentrated HCl. The mixture is heated to 50° C. and maintained at that temperature with stirring for 72 hours. The mixture is allowed to come to room temperature, about 23–25° C. and then diluted with 50 parts of n-hexane. The n-hexane mixture is cooled to about 5° C. A precipitate forms which is filtered and dried to yield $\alpha^2,\alpha^6$-bis(3-tert-butyl-4-hydroxy-5-isopropylphenyl)mesitol.

Further good results are obtained when 2-ethyl-6-isopropylphenol is reacted with 2,6-dimethylol-4-ethylphenol in sec-butyl acetate with a catalytic quantity of phosphoric acid to yield $\alpha^2,\alpha^6$-bis(3-ethyl-4-hydroxy-5-isopropylphenyl)-4-ethyl-2,6-xylenol. Likewise 2,6-di-n-decylphenol can be reacted with 2,6-dimethylol-4-tert-butylphenol in hexane with a catalytic amount of HI to yield $\alpha^2,\alpha^6$ - bis(3,5 - di - n - decyl - 4 - hydroxyphenyl) - 4-tert-butyl-2,6-xylenol. Also, 2,6-dicyclohexylphenol can be reacted in benzene with 2-(1-n-octanol)-4,6-di-n-undecylphenol and a catalytic amount of HCl to yield $\alpha$-(3,5 - dicyclohexyl - 4 - hydroxyphenyl) - $\alpha$ - n - heptyl-4,6-di-n-undecyl-o-cresol.

Example 8

In a reaction vessel equipped with heating means, stirring means, temperature measuring means, gas inlet and outlet tubes and a nitrogen source are placed 177 parts of 2-tert-butyl-6-ethylphenol, 84 parts of 2,6-dimethylol-4-n-propylphenol, 165 parts of concentrated HCl. The reaction vessel is flushed with nitrogen, heated to 100° C. and maintained at that temperature for 48 hours. The mixture is then allowed to cool to room temperature, about 23–25° C. and the nitrogen is vented. The mixture is dissolved in 300 parts of n-hexane. A precipitate forms which is filtered and dried to yield $\alpha^2,\alpha^6$-bis(3-tert-butyl - 5 - ethyl - 4 - hydroxyphenyl) - 4 - n - propyl-2,6-xylenol.

Following the above procedure good results are also obtained when 2,6-di-n-propylphenol is reacted with 2,6-dimethylol-p-cresol with a catalytic amount of HBr to produce $\alpha^2,\alpha^6$-bis(3,5-di-n-propyl-4-hydroxyphenyl)mesitol. Likewise 2-n-amyl-6-n-monylphenol can be similarly reacted with 2,6-dimethylol-p-tert-amylphenol with a catalytic amount of $POCl_3$ to yield $\alpha^2,\alpha^6$-bis(2-n-amyl-4-hydroxy-5-n-nonylphenyl) - 4 - p - tert - amyl-2,6-xylenol. Also 2 - p - tert - butylcyclohexyl-6-p-sec-butylcyclopentylphenol can be reacted with 2,6-dimethylol-4-n-hexylphenol with a catalytic amount of $MgCl_2$ to yield $\alpha^2,\alpha^6$-bis(3-p-tert - butylcyclohexyl-5-p-sec-butylcyclopentyl-4-hydroxyphenyl)-4-p-n-hexyl-2,6-xylenol. Further, 2,6 - dibenzylphenol can be reacted with 2-n-butyl-6-n-heptyl-4-(1-n-hexanol) phenol in dioxane and with a catalytic amount of HCl to yield $\alpha$-(3,5-dibenzyl-4-hydroxyphenyl)-$\alpha$-n-amyl-4-n-butyl-6-n-heptyl-o-cresol.

Examples of the compounds produced by the practice of this invention include:

$\alpha^2,\alpha^4$-Bis-(3-5-di-tert-butyl-4-hydroxyphenyl)mesitol;
$\alpha^2,\alpha^4$-Bis-(3-tert-butyl-4-hydroxy-5-methylphenyl) mesitol;
$\alpha^2,\alpha^4$-Bis-(3-5-di-tert-butyl-4-hydroxyphenyl-6-tert-butyl-2,4-xylenol;
$\alpha^2,\alpha^6$-Bis-(3-p-methylcyclopentyl-5-n-octyl-4-hydroxyphenyl)-$\alpha^2,\alpha^6$-di-p-n-amylphenyl-4-p-n-hexylcyclohexyl-2,6-xylenol;
$\alpha$-(3,5-dicyclohexyl-4-hydroxyphenyl)-$\alpha$-n-heptyl-4,6-di-n-undecyl-o-cresol;
$\alpha^2,\alpha^6$-Bis-[3-($\alpha$-n-propylbenzyl)-5-($\alpha,\alpha$-dimethylbenzyl)-4-hydroxyphenyl]-$\alpha^2,\alpha^6$-diphenyl-4-n-octyl-2,6-xylenol;
$\alpha$-(3,5-dibenzyl-4-hydroxyphenyl)-$\alpha$-n-amyl-4-n-butyl-6-n-heptyl-o-cresol;
$\alpha$-(3-p-n-amylcyclohexyl-5-cyclopentyl-4-hydroxyphenyl)-$\alpha$-n-decyl-2-n-propyl-6-n-nonyl-p-cresol; and
$\alpha$-(3,5-di-tert-octyl-4-hydroxyphenyl)-2,6-diisopropyl-p-cresol.

In a preferred embodiment the objects of this invention are accomplished by providing a process which comprises reacting a compound having the formula (VI)

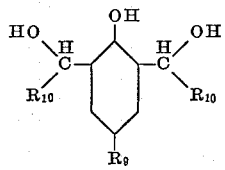

wherein $R_9$ is selected from the group consisting of alkyl of from 1–12 carbon atoms, aralkyl of from 7–12 carbon atoms and cycloalkyl of from 5–12 carbon atoms and $R_{10}$ is selected from the group consisting of hydrogen, alkyl of from 1–12 carbon atoms and mononuclear aryl of from 6–12 carbon atoms; with a compound of Formula I.

The compounds produced by the practice of this preferred embodiment have the formula (VII)

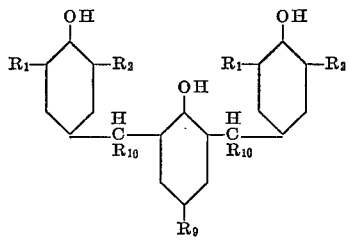

wherein $R_1$ and $R_2$ are as in Formula I and $R_9$ and $R_{10}$ are as in Formula VI.

Examples of the preferred compounds produced by the practice of this invention include:

$\alpha^2,\alpha^6$-Bis(3,5-di-tert-butyl-4-hydroxyphenyl)mesitol;
$\alpha^2,\alpha^6$-Bis(3,5-diisopropyl-4-hydroxyphenyl)mesitol;
$\alpha^2,\alpha^6$-Bis(3,5-diisopropyl-4-hydroxy)-4-tert-octyl-2,6-xylenol;
$\alpha^2,\alpha^6$-Bis(3-n-decyl-4-hydroxy-5-n-octylphenyl)-$\alpha^2,\alpha^6$-dimethyl-4-n-propyl-2,6-xylenol;
$\alpha^2,\alpha^6$-Bis(3-p-ethylcyclohexyl-5-cyclopentyl-4-hydroxyphenyl)-$\alpha^2,\alpha^6$-di-n-dodecyl-4-n-octyl-2,6-xylenol;
$\alpha^2,\alpha^6$-Bis(3-5-dibenzyl-4-hydroxyphenyl)-$\alpha^2,\alpha^6$-di-sec-butyl-4-n-heptyl-2,6-xylenol;
$\alpha^2,\alpha^6$-Bis[3-($\alpha$-ethylbenzyl) - 5 - ($\alpha,\alpha$ - diethylbenzyl)-4-hydroxyphenyl]-$\alpha^2,\alpha^6$-diphenyl-4-n-heptyl-2,6-xylenol;
$\alpha^2,\alpha^6$-Bis(3-5-dicyclohexyl-4-hydroxyphenyl)-$\alpha^2,\alpha^6$-di-n-octyl-4-n-dodecyl-2,6-xylenol;
$\alpha^2,\alpha^6$-Bis[3-p-n-propylcyclohexy-5-($\alpha$-n-propylbenzyl)-4-hydroxyphenyl]-$\alpha^2,\alpha^6$-di-p-n-hexylphenyl-4-cyclopentyl-2,6-xylenol; and
$\alpha^2,\alpha^6$-Bis(3-p-ethylcyclopentyl-5-n-heptyl-4-hydroxyphenyl)-$\alpha^2,\alpha^6$-di-p-n-propylphenyl-4-p-n-amylcyclohexyl-2,6-xylenol.

In a particularly preferred embodiment of this invention the compounds to be produced consists of compounds of Formula VII wherein $R_{10}$ is hydrogen. These compounds are particularly preferred because of their ease of preparation from readily available starting material and their better stability. Among the compounds prepared by this embodiment are:

$\alpha^2,\alpha^6$-Bis(3-benzyl-5-p-ethylcyclohexyl-4-hydroxyphenyl)-4-tert-octyl-2,6-xylenol;
$\alpha^2,\alpha^6$-Bis[3-p-n-propylcyclohexyl-5-($\alpha$-n-propylbenzyl)-4-hydroxyphenyl]-4-cyclopentyl-2,6-xylenol;
$\alpha^2,\alpha^6$-Bis(3,5-dicyclopentyl-4-hydroxyphenyl)-4-cyclohexyl-2,6-xylenol;
$\alpha^2,\alpha^6$-Bis(3-p-n-amylbenzyl-5-o-methylcyclohexyl-4-hydroxyphenyl)-4-p-n-amylbenzyl-2-6-xylenol;
$\alpha^2,\alpha^6$-Bis[3-($\alpha$-methylbenzyl)-5-($\alpha$-ethyl-$\alpha$-methylbenzyl)-4-hydroxyphenyl]mesitol;
$\alpha^2,\alpha^6$-Bis(3,5-di-n-dodecyl-4-hydroxyphenyl)-4-tert-butyl-2,6-xylenol;
$\alpha^2,\alpha^6$-Bis(3,5-di-tert-butyl-4-hydroxyphenyl-4-n-nonyl-2,6-xylenol; and
$\alpha^2,\alpha^6$-Bis(3,5-di-tert-butyl-4-hydroxyphenyl-4-tert-octyl-2,6-xylenol.

Still more particularly preferred compounds produced by the practice of this invention consist of compounds of Formula VII wherein $R_{10}$ is hydrogen, $R_9$ is an alkyl group of from 1–8 carbon atoms and $R_1$ and $R_2$ are each independently selected alpha-branched alkyl groups of from 3–12 carbon atoms. These are preferred because of their ease of preparation and their excellent antioxidant properties. Among the compounds prepared by this embodiment are:

$\alpha^2,\alpha^6$-Bis(3,5-di-tert-butyl-4-hydroxyphenyl)mesitol;
$\alpha^2,\alpha^6$-Bis-(3-tert-butyl-4-hydroxy-m-tolyl)mesitol;
$\alpha^2,\alpha^6$-Bis(3,5-diisopropyl-4-hydroxyphenyl)mesitol;
$\alpha^2,\alpha^6$-Bis(3,5-di-tert-butyl-4-hydroxyphenyl)-4-tert-octyl-2,6-xylenol;
$\alpha^2,\alpha^6$-Bis(3-tert-butyl-4-hydroxy-m-tolyl)-4-tert-octyl-2,6-xylenol;
$\alpha^2,\alpha^6$-Bis(3,5-diisopropyl-4-hydroxyphenyl)-4-tert-octyl-2,6-xylenol;
$\alpha^2,\alpha^6$-Bis(3-sec-butyl-5-n-hexyl-4-hydroxyphenyl)-4-ethyl-2,6-xylenol; and
$\alpha^2,\alpha^6$-Bis(3,5-di-n-dodecyl-4-hydroxyphenyl)-4-tert-butyl-2,6-xylenol.

The most particularly preferred compounds produced by the practice of this invention consist of compounds of Formula VII wherein $R_{10}$ is hydrogen, $R_9$ is selected from the group consisting of methyl and tert-octyl radicals, $R_2$ is a tert-butyl radical and $R_1$ is selected from the group consisting of methyl and tert-butyl radicals. This embodiment is most particularly preferred because these compounds have been found to have excellent antioxidant properties and are the most readily prepared by the methods described in this application. Examples of the compounds prepared by this embodiment are:

$\alpha^2,\alpha^6$-Bis(3,5-di-tert-butyl-4-hydroxyphenyl)mesitol;
$\alpha^2,\alpha^6$-Bis(3-tert-butyl-4-hydroxy-m-tolyl)mesitol;
$\alpha^2,\alpha^6$-Bis(3,5-di-tert-butyl-4-hydroxyphenyl)-4-tert-octyl-2,6-xylenol and
$\alpha^2,\alpha^6$-Bis(3-tert-butyl-4-hydroxy-m-tolyl)-4-tert-octyl-2,6-xylenol.

The compounds produced by the practice of this invention are outstanding antioxidants. Therefore, a specific utility of this invention is the production of an improved composition of matter which comprises organic material normally tending to undergo oxidative deterioration containing an appropriate quantity—from 0.001 up to about 5 percent, and preferably from about 0.25 to about 2 percent—of a compound produced by this invention.

The compounds produced by the practice of this invention find important utility as antioxidants in a wide variety of oxygensensitive material. Thus, liquid hydrocarbon fuels such as gasoline, kerosene and fuel oil are found to possess increased storage stability by the use of an antioxidant produced by this invention. Likewise, liquid hydrocarbon fuels such as gasoline which contain organometallic additives such as tetraethyllead as well as other organometallic compounds which are used as fuel additives attain appreciably increased oxidative stability by the use of compounds produced by the practice of this invention. In addition, lubricant oils and functional fluids, both those derived from naturally occurring hydrocarbons and those synthetically prepared are greatly enhanced by compounds produced by the practice of this invention. The addition of small quantities of the compounds produced by this invention to such materials as turbine, hydraulic, transformer and other highly refined industrial oils, soaps and greases; plastics, synthetic polymers such as polyethylene and polypropylene; organometallic compositions where such fluids contain tetraethyllead and tetraethyllead antiknock mixtures as well as other organometallics; elastomers, including natural rubber, lubricating greases; crankcase lubricating oils; and the like, greatly increase resistance to deterioration in the presence of air, oxygen or ozone.

The compounds produced by the practice of this invention are also very useful in protecting petroleum wax—paraffin wax and microcrystalline wax—against oxidative deterioration. They also find use in the stabilization of edible fats and oils of animal and vegetable origin which tend to become rancid, especially during long periods of storage because of oxidative deterioration. Typical representatives of these edible fats and oils are linseed oil, cod liver oil, castor oil, soybean oil, rapeseed oil, coconut oil, olive oil, palm oil, corn oil, sesame oil, peanut oil, babassu oil, butter fat, lard, beef tallow, and the like.

The compounds produced by the practice of this invention are also useful in preventing oxidative deterioration in lubricating oil composition. Thus, a specific utility of these compounds is lubricating oil normally susceptible to oxidative deterioration containing a small antioxidant amount, up to 5 percent, of a compound as defined above.

To prepare such superior lubricants an appropriate quantity—from about 0.001 to about 5 percent and preferably from about 0.25 to about 2 percent—of a compound produced by the practice of this invention is blended with the base oil to be protected. Suitable base oils include mineral oils and also synthetic diester oils such as sebacates, adipates, etc., which find particular use as aircraft instrument oils, hydraulic and damping fluids and precision bearing lubricants. All of these base oils are normally susceptible to oxidative deterioration, especially at elevated temperatures. The finished lubricants have much greater oxidation stability and many other improved performance characteristics as compared with the corresponding base oils.

To illustrate the outstanding advantages achieved by the practice of the preferred embodiments of this invention, particularly when the compositions are subjected to elevated temperatures, experiments were conducted using the Panel Coker test. This test measures the oxidative stability of oils which are maintained at elevated temperatures in the presence of air, the oils periodically coming in contact with a hot metal surface. The test is described in the Aeronautical Standards of the Departments of Navy and Air Force, Spec. MIL–L–7808c dated November 2, 1955. In these tests an initially additive-free 95 V.I. solvent-refined SAE-10 crankcase oil was used. The Panel Coker apparatus was operated at 600° F. for 10 hours on a cycling schedule—the splasher being in operation for 5 seconds followed by a quiescent period of 55 seconds. On completion of these tests the extent by which the various test oils were decomposed under these high-temperature oxidizing conditions was determined by weighing the amount of deposit which formed on the metallic panel. The results are given in Table I.

TABLE I.—PANEL COKER DATA

| Additive | Concentration, Percent | Panel Weight Gain, mg. |
|---|---|---|
| None | | 434 |
| $\alpha^2,\alpha^6$-Bis(5-tert-butyl-4-hydroxy-m-tolyl) mesitol | 1 | 28 |
| $\alpha^2,\alpha^6$-Bis(3,5-di-tert-butyl-4-hydroxyphenyl) mesitol | 1 | 97 |

It can be seen from the above results that the compounds of this invention provide outstanding resistance to oxidative deterioration.

I claim:

A process for preparing benzylphenols which comprises reacting 2,6-di-methylol-p-cresol with 2-methyl-6-tert-butylphenol in the presence of an acid catalyst.

References Cited by the Examiner

UNITED STATES PATENTS

| 2,732,406 | 1/1956 | Lambert | 260—619 |
| 2,905,737 | 9/1959 | Webb | 260—619 X |
| 3,091,645 | 5/1963 | Rocklin | 260—619 |

FOREIGN PATENTS 1,263,155  4/1961  France.

OTHER REFERENCES

Abstract of Australian application S.N. 62,986/60 by Shell International, etc., open to inspection Feb. 2, 1961 (1 page).

LEON ZITVER, *Primary Examiner.*

CHARLES B. PARKER, *Examiner.*

H. G. MOORE, D. M. HELFER, *Assistant Examiners.*